United States Patent
Kim

[11] Patent Number: 5,838,386
[45] Date of Patent: Nov. 17, 1998

[54] ON SCREEN DISPLAY CIRCUIT AND POSITION DETECTOR

[75] Inventor: Ho-hyun Kim, Kyungsangbuk-do, Rep. of Korea

[73] Assignee: LG Semicon Co., Ltd., Chungcheongbuk-do, Rep. of Korea

[21] Appl. No.: 667,698

[22] Filed: Jun. 21, 1996

[30] Foreign Application Priority Data

Jun. 21, 1995 [KR] Rep. of Korea .................. 1995-16646

[51] Int. Cl.[6] .................................................. H04N 5/445
[52] U.S. Cl. .......................... 348/569; 348/601; 348/589; 348/563; 345/26
[58] Field of Search .................................... 348/569, 601, 348/563, 564, 589, 600; 345/146, 26; H04N 5/50, 9/76, 5/445

[56] References Cited

U.S. PATENT DOCUMENTS

| | | | |
|---|---|---|---|
| 5,212,553 | 5/1993 | Maruka | 348/563 |
| 5,379,054 | 1/1995 | Tanaka et al. | 345/163 |
| 5,604,544 | 2/1997 | Betram | 348/563 |
| 5,623,316 | 4/1997 | Naito et al. | 348/569 |
| 5,640,172 | 6/1997 | Kim | 348/569 |
| 5,673,087 | 9/1997 | Choi et al. | 348/569 |

*Primary Examiner*—John K. Peng
*Assistant Examiner*—Jean W. Dësly
*Attorney, Agent, or Firm*—Loudermilk & Associates

[57] ABSTRACT

In an on-screen display (OSD) circuit and position detector, the OSD circuit includes a menu OSD circuit for outputting video signals Rm, Gm and Bm and switch signal Ym, a pointer OSD circuit for selecting displayed menu items and for outputting video signals Rp, Gp and Bp and switch signal Yp, and a pointer or menu selecting circuit for receiving the video signals of the menu OSD circuit, Rm, Gm and Bm and switch signal Ym as inputs, and receiving the video signals of the pointer OSD circuit, Rp, Gp and Bp and switch signal Yp as inputs to then first select the output of the pointer OSD circuit, and then to selectively output the output of the menu OSD circuit if there is no output from the pointer OSD circuit. A method of remotely controlling a television receiver using the OSD circuit is performed such that a video signal applied to the television receiver is displayed on a screen, if there is a necessity/desire of controlling the television receiver, a control menu and a pointer are together displayed, the position of the pointer is moved to a desired menu by a remote controller, and then the desired menu is selected by a selection signal of the remote controller, thereby operating the television receiver in a desirable way.

9 Claims, 5 Drawing Sheets

ON SCREEN DISPLAY CIRCUIT AND POSITION DETECTOR

FIELD OF THE INVENTION

The present invention relates to on-screen display (OSD) circuits, and more particularly to OSD circuits that can simply control electronic appliances such as television sets or video cassette recorders such that a pointer, which can be moved on a screen, and whose position value can be read, is displayed on the screen.

BACKGROUND OF THE INVENTION

FIG. 1 is a block diagram illustrating an example of a conventional OSD circuit. In FIG. 1, OSD oscillator 11 generates an OSD clock. Vertical position detector 12 generates a vertical position arrival signal (VPS) if a counted value becomes zero when down-counting from a vertical position value loaded by a vertical synchronization signal (VSYNC) extracted from a video signal according to a horizontal synchronization signal (HSYNC). Horizontal position detector 13 generates a horizontal position arrival signal (HPS) if a counted value becomes zero when down-counting from a horizontal position value loaded by a horizontal synchronization signal (HSYNC). Timing generator 14 generates a horizontal dot clock obtained by frequency dividing the OSD clock according to character size when VPS and HPS are activated. RAM address generator 15 generates RAM read addresses using the horizontal dot clock.

OSD RAM 17 stores addresses and colors of characters to be displayed. The character (a character or a symbol icon, etc.) address and color are output by the RAM read address signal. Row address generator 16 generates a row address by counting HSYNC when VPS becomes active. Font ROM 18 stores font data, and the font data are output by the character address and row address. Shift register 19 has the font data loaded, and serial font data is output using the horizontal dot clock as a shift clock. Output controller 20 produces colors of red (R), green (G) and blue (B) and switching signal (Y) using the serial font data and character color signal.

The operation of the OSD circuit having the aforementioned configuration as illustrated in FIG. 1 will now be described.

First, the information relating to matters that the central controller (not shown) intends to display is transmitted via a data bus. In other words, the information relating to the characters and colors to be displayed and the information relating to the displayed horizontal and vertical portions are transmitted. Then, vertical position detector 12 down-counts according to the HSYNC from the vertical position value received via the data bus loaded by the VSYNC and activates the vertical position arrival signal (VPS) if the counted value becomes zero. Horizontal position detector 13 down-counts according to the OSD clock from the horizontal position value received via the data bus loaded by the HSYNC and activates the horizontal position arrival signal (HPS) if the counted value becomes zero. If VPS and HPS are activated, the horizontal dot clock obtained by frequency-dividing the OSD clock is generated in timing generator 14 according to the character size. RAM address generator 15 receives the horizontal dot clock to produce a RAM read address.

Next, OSD RAM 17 stores the address and color of the character to be displayed which is received via the data bus, and then outputs the character address and the character color according to a RAM read address signal from RAM address generator 15. Row address generator 16 receives the activated VPS signal from vertical position detector 12 and counts the HSYNC to produce a row address. Thereafter, font ROM 18 receives the character address from OSD RAM 17 and the row address from row address generator 15 and outputs the stored font data. Shift register 19 receives the font data and converts the font data into serial font data using the horizontal dot clock as a shift clock to be output. Output controller 20 produces and transmits color signals of red (R), green (G), blue (B) and switching signal (Y) using the serial font data and character and color signal.

Such a conventional OSD circuit only displays a remotely-operated state but executes no further function.

SUMMARY OF THE INVENTION

It is an object of the present invention to provide an on screen display (OSD) circuit for controlling a display device with a simple remote controller by additionally offering a pointer display and position detection function to a conventional OSD circuit.

To accomplish the above and other objects, there is provided an OSD circuit according to the present invention comprising: a menu OSD circuit for outputting video signals Rm, Gm and Bm and switch signal Ym; a pointer OSD circuit for selecting displayed menu items for outputting video signals Rp, Gp and Bp and switch signal Yp; and a pointer or menu selecting circuit for receiving the video signals of the menu OSD circuit, Rm, Cm and Bm and switch signal Ym, as inputs, and receiving the video signals of the pointer OSD circuit, Rp, Gp and Bp and switch signal Yp, as inputs to first select the output of the pointer OSD circuit, and then to selectively output the output of the menu OSD circuit if there is no output from the pointer OSD circuit.

The pointer OSD circuit includes a pointer vertical position detector for up/down-counting a clock (YMVCLK) which determines the speed of moving a pointer vertically according to an up- or down-signal to transmit the counted value to a data bus as a vertical position value, and down-counting the vertical position value according to HSYNC to activate a vertical detection signal when the counted value is zero, a pointer horizontal position detector for up/down-counting a clock (XMVCLK) which determines the speed of moving a pointer horizontally according to a left- or right-signal to output the counted value as a horizontal position value, and loading the horizontal position value according to the HSYNC and down-counting the horizontal position value according to an OSD clock to activate a horizontal detection signal when the counted value is zero, a timing generator for activating a pointer read signal when the vertical detection and the horizontal detection signal are simultaneously activated and generating and outputting a shift signal using the OSD clock generated in the OSD circuit, a row address generator for counting the HSYNC when the vertical detection signal is activated and generating a row address, a pointer font ROM for outputting pointer font data by a row address when the pointer read signal is activated, a shift register for receiving the loaded pointer font data and shifting the same by a shift signal to output a serial pointer font data signal, a pointer color register for receiving and storing pointer color data R, G and B via a data bus, and an output controller for receiving the pointer font data from the shift register and outputting video signals Rp, Gp and Bp and selection signal Yp according to a pointer color signal from the pointer color register.

The pointer vertical position detector is constituted by an up/down bi-directional counter for up/down-counting a clock (YMVCLK) which determines the speed of moving a pointer vertically according to a up- or down-signal to transmit the counted value to a data bus as a vertical position value, and a reloadable down-counter for loading the vertical position value according to the VSYNC and down-counting the horizontal position value according to the HSYNC to activate a vertical detection signal when the counted value is zero.

The pointer horizontal position detector is constituted by an up/down bi-directional counter for up/down-counting a clock (XMVCLK) which determines the speed of moving a pointer horizontally according to a left- or right-signal to output the counted value as a horizontal position value, and a reloadable down-counter for loading the horizontal position value according to the HSYNC and down-counting the horizontal position value according to an OSD clock to activate a horizontal detection signal when the counted value is zero.

The pointer or menu selector is constituted by a multiplexer for receiving the video signals of the menu OSD circuit, Rm, Gm and Bm and the video signals of the pointer OSD circuit, Rp, Gp and Bp as inputs to then first selectively output the video signals of the pointer OSD circuit, Rp, Gp and Bp if there is a switch signal of the pointer OSD circuit, Yp, and an OR circuit for receiving the switch signal of the menu OSD circuit, Ym, and switch signal of the pointer OSD circuit, Yp, to then output an OR product.

To implement the OSD circuit according to the present invention, there is provided a method of remotely controlling a television receiver wherein a video signal applied to the television receiver is displayed on a screen, if there is a necessity of controlling the television receiver, a control menu and a pointer are displayed together, the position of the pointer is moved to a desired menu by a remote controller, and then the desired menu is selected by a selection signal of the remote controller, thereby operating the television receiver in a desirable way, the method comprising the steps of: displaying a menu using a menu OSD circuit; generating an indication signal for moving the pointer up and down or left and right by the remote controller in order to move the pointer; up/down-counting a clock (YMVCLK) which determine the speed of moving the pointer vertically according to a up- or down signal to set the counted value as a vertical position value; loading the vertical position value by the VSYNC to be down-counted according to the HSYNC and generating a vertical detection signal when the counted value is zero; up/down-counting a clock (XMVCLK) which determines the speed of moving the pointer horizontally according to a left- or right-signal to set the counted value as a horizontal position value; down-counting the horizontal position value by the HSYNC according to an OSD clock and generating a horizontal detection signal when the counted value is zero; activating a pointer read signal when the vertical detection signal and the horizontal detection signal are simultaneously activated; producing a shift signal using the OSD clock; counting the HSYNC when the vertical detection signal is activated and generating a row address; outputting pointer font data by the row address when the pointer read signal is activated; shifting the loaded pointer font data by a shift signal to produce a serial pointer font data signal; outputting the pointer font data signal as a pointer video signal RGB according to a given pointer color signal; and switching the pointer video signal into the output video signals RED, GREEN and BLUE and transmitting the same upon the generation of the pointer video signal RGB during transmission of the video signal RGB generated in the menu OSD circuit as output signals RED, GREEN and BLUE.

BRIEF DESCRIPTION OF THE DRAWINGS

The above objects and advantages of the present invention will become more apparent by describing in detail the preferred embodiments thereof with reference to the attached drawings in which.

DESCRIPTION OF PREFERRED
EMBODIMENTS OF THE INVENTION

Figure 1:
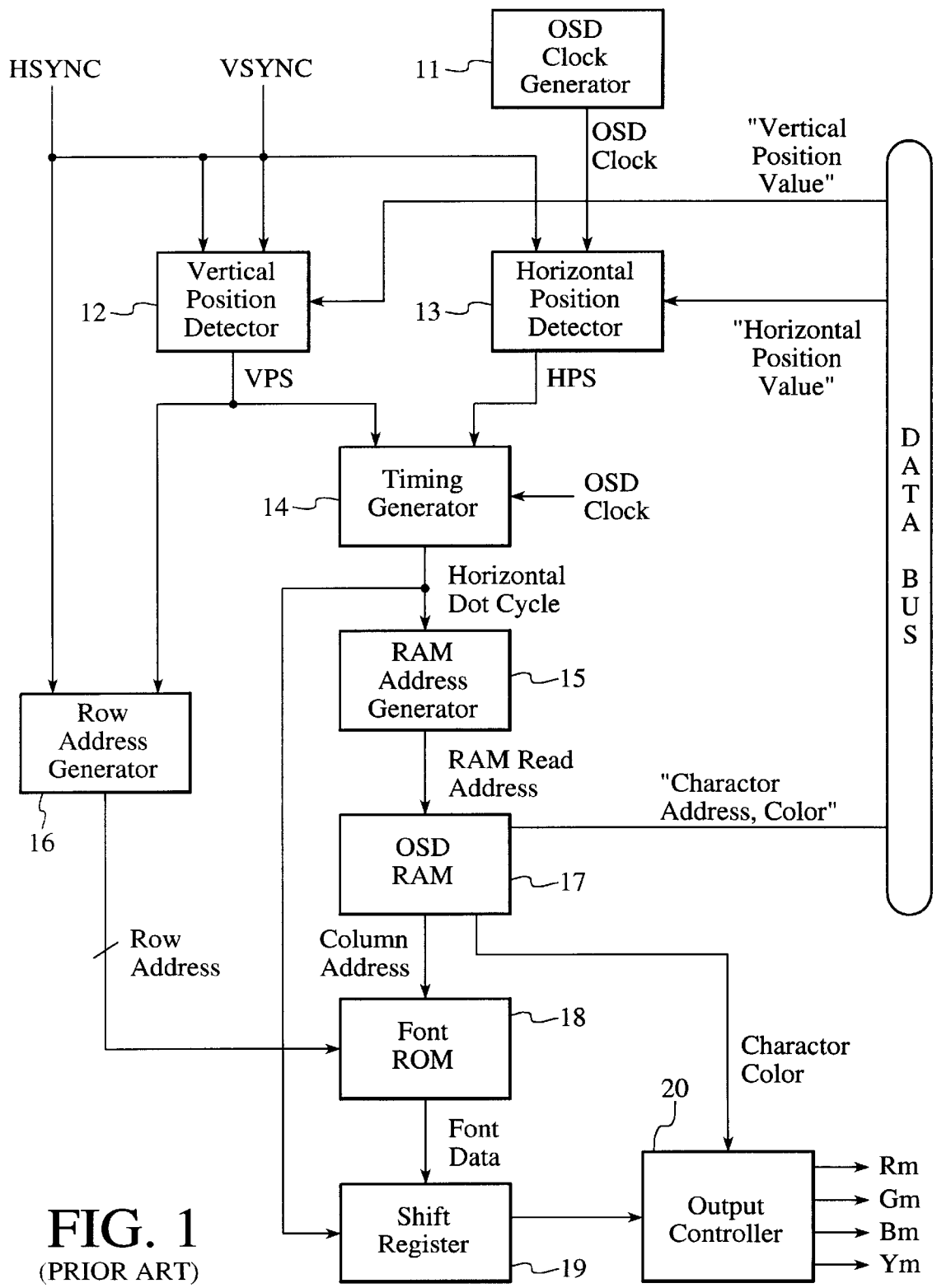
FIG. 1 is a block diagram of a conventional OSD circuit.

OSD circuits according to the present invention preferably include a general menu OSD, a pointer OSD for displaying a pointer and a pointer menu selector for receiving video signals of the menu OSD and video signals of the pointer OSD and selectively outputting the output of the pointer OSD. The menu OSD adopts a general OSD, such as described in connection with FIG. 1, and outputs menu video signals Rm, Gm and Bm and switch signal Ym. The pointer OSD outputs pointer video signals Rp, Gp and Bp and switch signal Yp.

Figure 5:
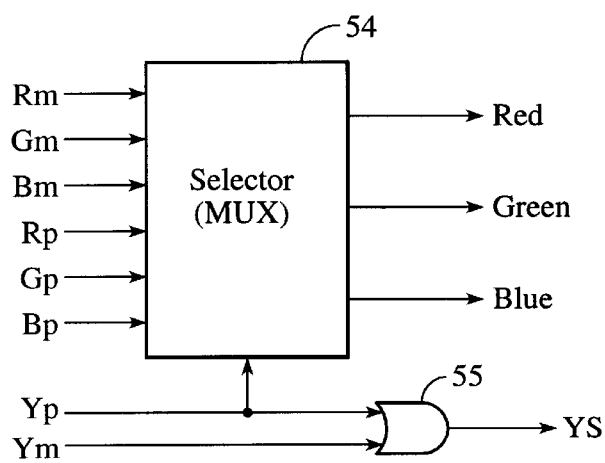
FIG. 5 is a block diagram of a pointer/menu selector.

The pointer or menu selector receives video signals of menu OSD 2, Rm, Gm and Bm and switch signal Ym, as inputs and video signals of pointer OSD 4, Rp, Gp and Bp and switch signal Yp, as inputs, and selectively outputs the output of pointer OSD 4, and selectively outputs the output of menu OSD 2 if there is no output from pointer OSD 4. Pointer or menu selector 6 is constituted in the preferred embodiment by MUX 54 and OR circuit 55, as illustrated in FIG. 5. The video signals of menu OSD 2, Rm, Gm and Bm, and the video signals of pointer OSD 4, Rp, Gp and Bp, are connected to inputs of MUX 54, and switch signal output Yp is connected to a control input of MUX 54. Also, the switch signal of pointer OSD 4, Yp, and the switch signal of menu OSD 2, Ym, are connected to inputs of OR circuit 55. Then, if the switch signal of pointer OSD 4, Yp, is output, the video signals of pointer OSD 4 are first selected to be output as video signals RED, GREEN and BLUE. Also, for displaying the menu and pointer, OSD switch signal YS is transmitted as an output of OR circuit 55. While outputting the video signals of menu OSD 2, Rm, Gm and Bm, which are output from MUX 54, as signals RED, GREEN and BLUE, if the selection signal Yp becomes 'high', the video signals of pointer OSD 4, Rp, Gp and Bp, are selected to be output. If the selection signal Yp becomes low, the video signals of menu OSD 2, Rm, Gm and Bm, are again selected to be output.

Figure 2A:
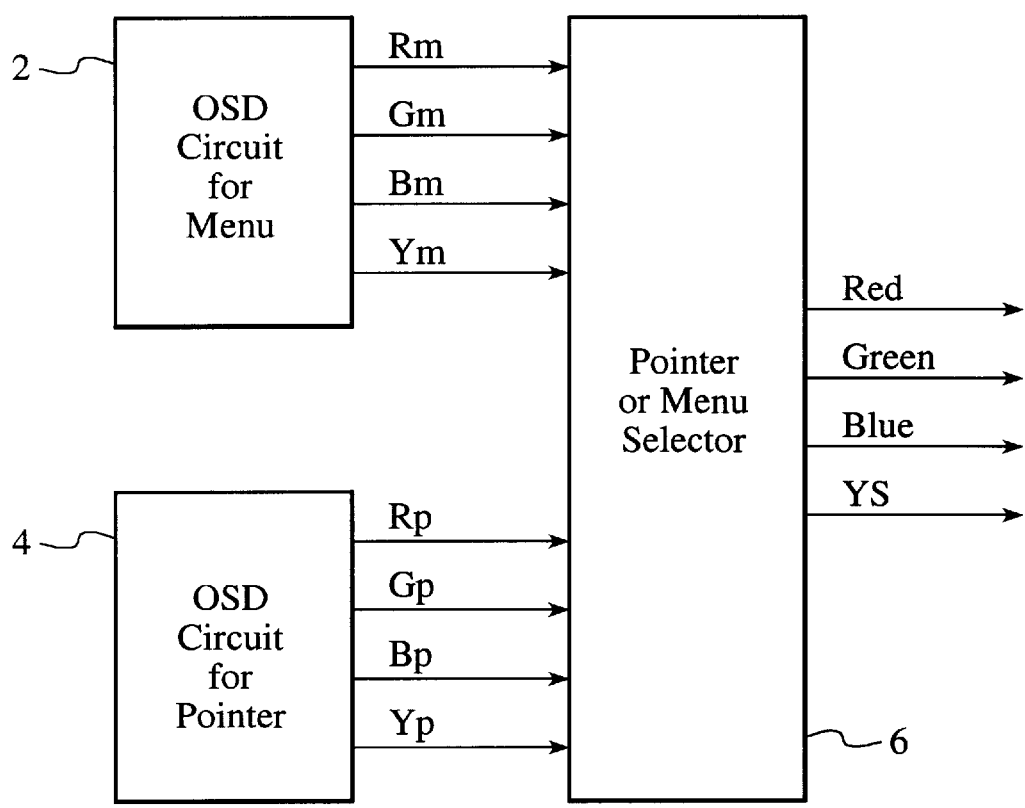
FIGS. 2A and 2B are block diagrams of an OSD circuit according to the present invention.
Figure 2B:
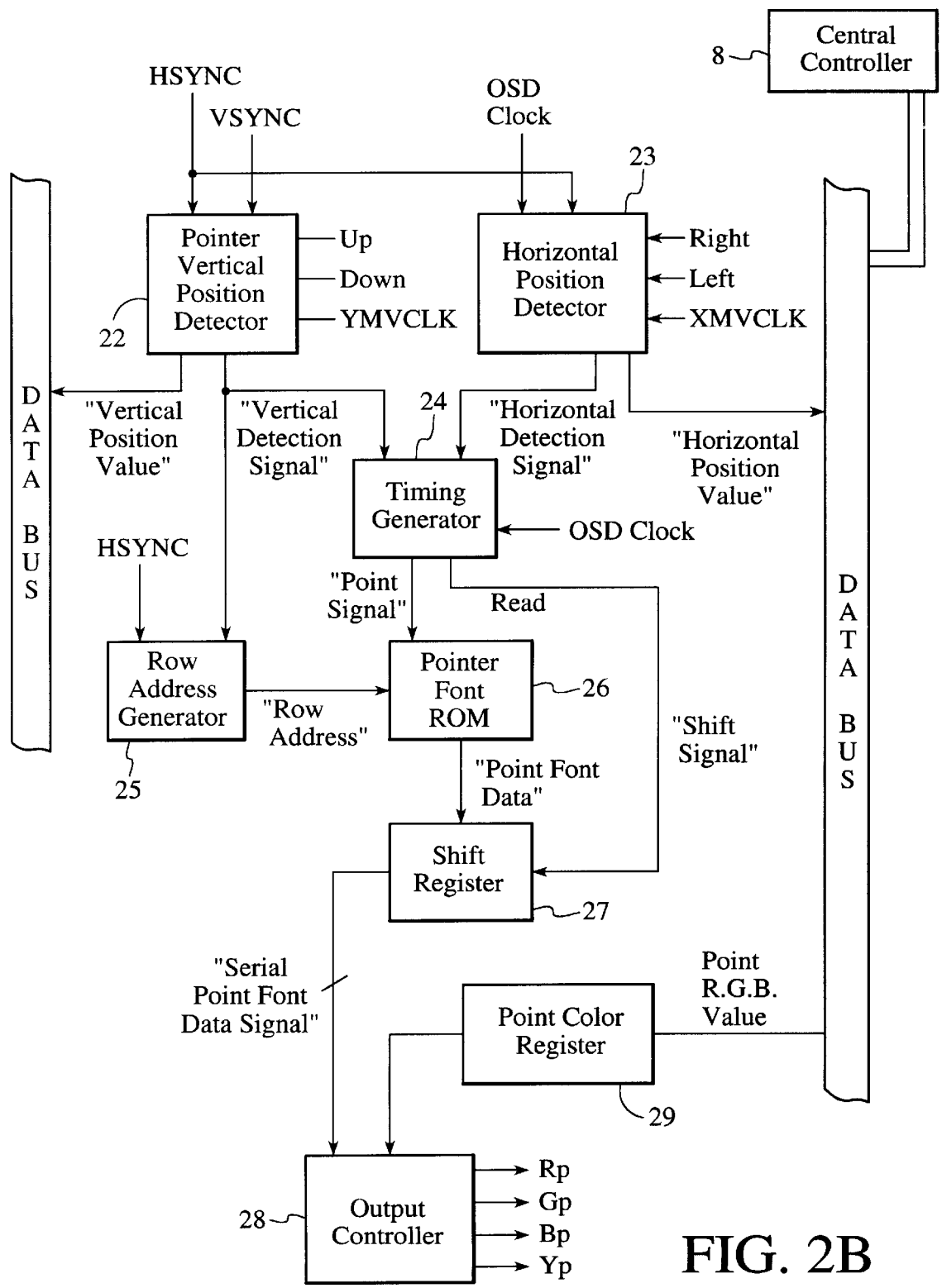
Figure 3:
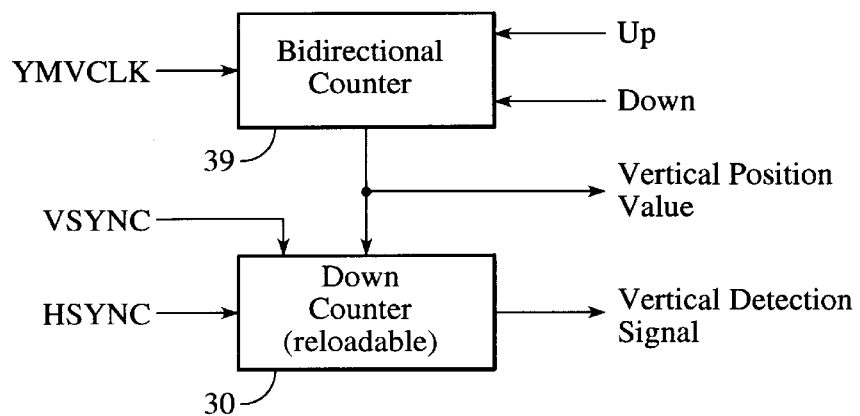
FIG. 3 is a block diagram of a pointer position detector.

The preferred embodiment of pointer OSD 4 is illustrated in FIG. 2B. The preferred embodiment of pointer vertical position detector 22 has a configuration as illustrated in FIG. 3. Up/down bi-directional counter 39 up/down-counts a clock (YMVCLK), which determines the speed of moving a pointer vertically according to an up- or down-signal in order to transmit the counted value to a data bus as a vertical position value. Reloadable down-counter 30 loads the vertical position value according to VSYNC and down-counts the horizontal position value according to the HSYNC to activate a vertical detection signal when the counted value is zero.

Figure 4:
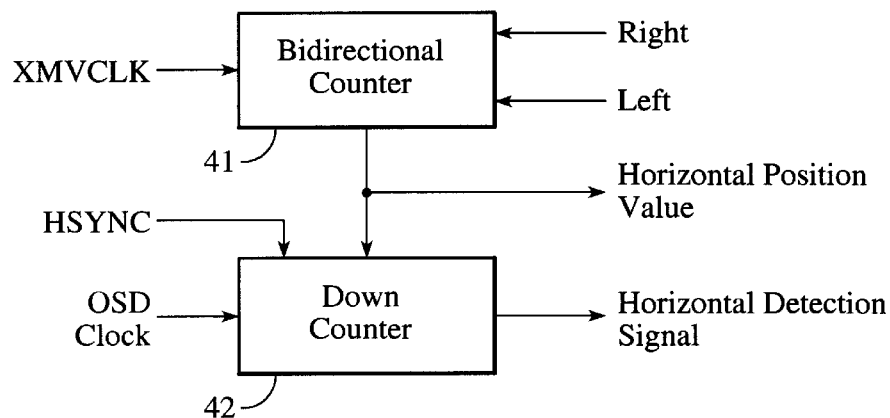
FIG. 4 is a block diagram of a pointer horizontal position detector.

The preferred embodiment of pointer horizontal position detector 23 has a configuration as illustrated in FIG. 4.

Up/down bi-directional counter 41 up/down-counts a clock (XMVCLK) which determines the speed of moving a pointer horizontally according to a left- or right-signal in order to output the counted value as a horizontal position value. Reloadable down-counter 42 loads the horizontal position value according to HSYNC and down-counts the horizontal position value according to the OSD clock which is a reference clock of an OSD circuit to activate a horizontal detection signal when the counted value is zero.

In FIG. 2B, timing generator 24 activates a pointer read signal when the vertical detection and the horizontal detection signal are simultaneously activated and generates and outputs a shift signal using the OSD clock generated in the general OSD circuit. Row address generator 25 counts HSYNC when the vertical detection signal is activated and generates a row address. Pointer font ROM 26 in which a pointer shape is coded, outputs pointer font data by a row address when the pointer read signal is activated. Shift register 27 receives the loaded pointer font data and shifts the same by a shift signal to output a serial pointer font data signal. Pointer color register 29 receives and stores pointer color data R, G and B via a data bus. Output controller 28 receives the pointer font data from shift register 27 and outputs video signals Rp, Gp and Bp and selection signal Yp according to a pointer color signal from pointer color register 29.

The operation of an OSD circuit according to a preferred embodiment of the present invention will now be described.

First, in order to move a pointer, an indication signal for moving the pointer up/down or left/right by remote controller 61 (see, e.g., FIG. 6) is generated. In pointer vertical position detector 22, up-/down bi-directional counter 39 up/down-counts a clock (YMVCLK) which determines the speed of moving the pointer vertically according to an up- or down-signal to set the counted value as a vertical position value, and reloadable down-counter 30 loads the vertical position value by VSYNC to be down-counted according to HSYNC and activates a vertical detection signal when the counted value is zero. In pointer horizontal position detector 23, up/down bi-directional counter 41 up/down-counts a clock (XMVCLK) which determines the speed of moving the pointer horizontally according to a left- or right-signal to transmit the counted value as a horizontal position value to central controller 8 (which may be a microcomputer or other data processing device) via a data bus, and reloadable down-counter 42 loads the horizontal position value by HSYNC and down-counts the horizontal position value according to the OSD clock to activate the horizontal detection signal when the counted value is zero.

Then, timing generator 24 activates a pointer read signal when the vertical detection signal and the horizontal detection signal are simultaneously activated and produces a shift signal using the OSD clock. Row address generator 25 counts HSYNC when the vertical detection signal is activated and generates a row address. Subsequently, pointer font ROM 26 outputs pointer font data according to the row address when the pointer read signal is activated. Next, shift register 27 shifts the loaded pointer font data by a shift signal to produce a serial pointer font data signal. Pointer color register 29 receives and stores pointer font data signal RGB from the data bus. Output controller 28 receives the stored signal to then switch the pointer video signal into the output video signals RED, GREEN and BLUE and output the same, and generates switch signal Yp.

Next, while pointer or menu selector 6 transmits the video signals of menu OSD 2, Rm, Gm, Bm as its outputs, if switch signal Yp is generated, the video signals of pointer OSD 4, Rp, Gp and Bp, are switched into output signals to be transmitted. In other words, if switch signal Yp is generated, the output of pointer OSD 4 is primarily selected. If there is no output from pointer OSD 4, the output of menu OSD 2 is selected and output.

Figure 6:
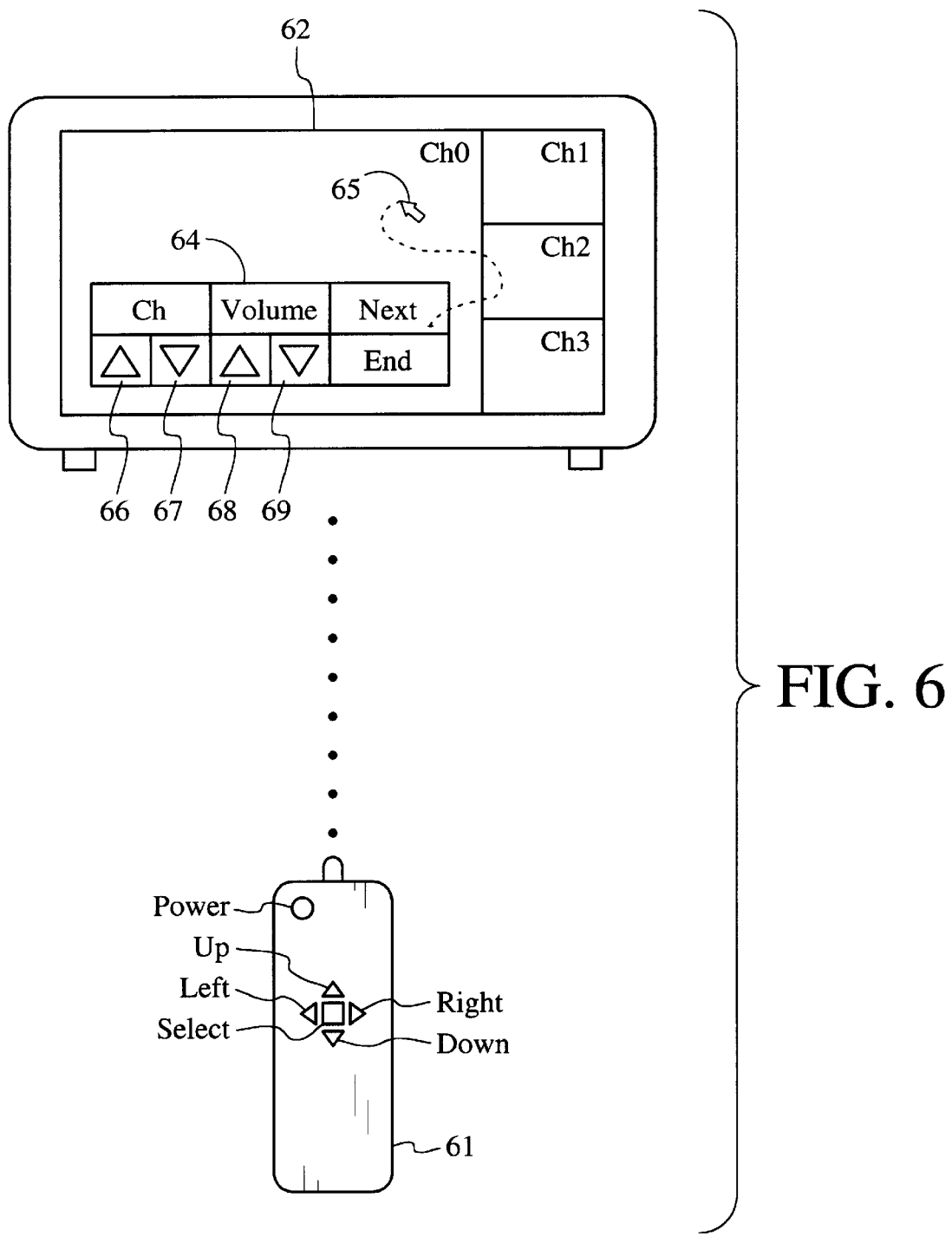
FIG. 6 shows an example applied to a television receiver.

FIG. 6 illustrates an example of menu and point displayed on a display device (e.g., CRT, television screen, computer monitor, LCD or other display device) using an OSD circuit according to the present invention.

According to the complicated functional capabilities and high-quality of the controlled device, such as a multi-screen television or television incorporating or coupled to video playback or receiver devices (VCRs, satellites, etc.) or having special audio functions, it is difficult to control the device, which necessitates many remote control keys, and it also is difficult to manipulate the device.

An OSD circuit according to the present invention simplifies remote controller 61 such as a mouse for a personal computer or other remote control device, as illustrated in FIG. 6. That is to say, main channel CH0 and several sub-channels CH1, CH2 and CH3 may be displayed on screen 62 as illustrated, in a general OSD circuit, if remote controller 61 is operated to display menu 64. Pointer 65 is moved to select a menu for channel selection, UP (66) or DOWN (67), a button for volume increase (68) or volume decrease (69), or next menu, thereby knowing the selected indicative content by determination of the position value by the central controller. Thus, it is possible to control the device by a simple remote controller.

Various conveniences according to the present invention can be implemented by adding circuitry to a conventional OSD circuit, a television having a centrally controlling microcomputer or a tape recorder having a display device, etc.

Although various preferred embodiments of the present invention have been disclosed for illustrative purposes, those skilled in the art will appreciate that various modifications, additions and/or substitutions are possible without departing from the scope invention as disclosed in and spirit of the present the claims.

What is claimed is:

1. An OSD circuit comprising:
    a menu OSD circuit for outputting video signals Rm, Gm and Bm and switch signal Ym;
    a pointer OSD circuit for selecting displayed menu items and for outputting video signals Rp, Gp and Bp and switch signal Yp; and
    a pointer/menu selecting circuit for receiving the video signals of the menu OSD circuit and switch signal Ym as inputs, and receiving the video signals of the pointer OSD circuit and switch signal Yp as inputs, wherein the pointer/menu selecting circuit selects the output video signals of the pointer OSD circuit, and selectively outputs the output video signals of the menu OSD circuit if there are no output video signals from the pointer OSD circuit.

2. The OSD circuit of claim 1, wherein the pointer OSD circuit comprises:
    a pointer vertical position detector for up/down-counting a Y clock which determines a speed of moving a pointer vertically according to an up- or down-signal to transmit a counted value to a data bus as a vertical position value, and down-counting the vertical position value according to an HSYNC signal to activate a vertical detection signal when the counted value is zero;

a pointer horizontal position detector for up/down-counting an X clock which determines a speed of moving a pointer horizontally according to a left- or right-signal to output a counted value, a horizontal position value, and loading the horizontal position value according to the HSYNC signal and down-counting the horizontal position value according to an OSD clock to activate a horizontal detection signal when the counted value is zero;

a timing generator for activating a pointer read signal when the vertical detection and the horizontal detection signal are simultaneously activated and generating and outputting a shift signal using the OSD clock generated in the OSD circuit;

a row address generator for counting the HSYNC signal when the vertical detection signal is activated and generating a row address;

a pointer font ROM for outputting pointer font data by the row address when a pointer read signal is activated;

a shift register for receiving the loaded pointer font data and shifting the same by the shift signal to output a serial pointer font data signal;

a pointer color register for receiving and storing pointer color data R, G and B via a data bus; and an output controller for receiving the pointer font data from the shift register and outputting video signals Rp, Gp and Bp and selection signal Yp according to a pointer color signal from the pointer color register.

3. The OSD circuit of claim 2, wherein the pointer vertical position detector comprises:

an up/down bi-directional counter for up/down-counting the Y clock which determines the speed of moving the pointer vertically according to the up- or down-signal to transmit the counted value to the data bus as the vertical position value; and a reloadable down-counter for loading the vertical position value according to a VSYNC signal and down-counting the horizontal position value according to the HSYNC signal to activate the vertical detection signal when the counted value is zero.

4. The OSD circuit of claim 2, wherein the pointer horizontal position detector comprises:

an up/down bi-directional counter for up/down-counting the X clock which determines the speed of moving the pointer horizontally according to the left- or right-signal to output the counted value as the horizontal position value; and a reloadable down-counter for loading the horizontal position value according to the HSYNC signal and down-counting the horizontal position value according to the OSD clock to activate the horizontal detection signal when the counted value is zero.

5. The OSD circuit of claim 2, wherein the pointer/menu selector circuit comprises:

a multiplexer for receiving the video signals of the menu OSD circuit and the video signals of the pointer OSD circuit as inputs to then first selectively output the video signals of the pointer OSD circuit if the switch signal of the pointer OSD circuit, Yp is active; and an OR circuit for receiving the switch signal of the menu OSD circuit, Ym, and the switch signal of the pointer OSD circuit, Yp, to then output an OR product of the Ym and Yp signals.

6. An OSD position detecting circuit comprising:

a first counter for up- or down-counting an input clock according to an external control signal to output a counted value; and a second counter for loading the output counted value of the first counter according to a load signal, counting another input clock to activate a position detection signal when the counted value becomes a predetermined value;

wherein the external control signal is one of an up- and down- indication control signals, wherein the counted value uses the one obtained by counting a horizontal synchronization signal as a vertical position value, and the output counted value of the first counter is loaded according to a vertical synchronization signal and is down-counted to the horizontal synchronization signal, to then activate a vertical position detection signal if the counted value becomes zero.

7. An OSD position detecting circuit comprising:

a first counter for up- or down-counting an input clock according to an external control signal to output a counted value; and a second counter for loading the output counted value of the first counter according to a load signal, counting another input clock to activate a position detection signal when the counted value becomes a predetermined value;

wherein the external control signal is one of left- and right-indication control signals, wherein the counted value uses an output counted value obtained by counting a dot clock as a horizontal position value, and the output counted value of the first counter is loaded according to the horizontal synchronization signal and is down-counted to the dot clock, to then activate a horizontal position detection signal if the counted value becomes zero.

8. An OSD position detecting circuit comprising:

a first counter for up- or down-counting an input clock of an up/down bi-directional counter according to an external control signal to output a counted value;

a second counter for loading the output counted value of the first counter according to a load signal, counting another input clock to then activate a position detection signal when the counted value becomes a predetermined value.

9. A method of remotely controlling a display device, wherein a video signal applied to the display device is displayed on a screen, wherein the display device is controlled by a control menu and a pointer displayed on the screen, wherein the position of the pointer is moved to a desired menu by a remote controller, and wherein the desired menu is selected by a selection signal of the remote controller, wherein the display device is controlled responsive to the selected menu, the method comprising the steps of:

displaying a menu on the screen using a menu OSD circuit;

generating an indication signal for moving the pointer up and down or left and right by the remote controller;

up/down-counting a Y clock which determines the speed of moving the pointer vertically according to an up- or down-signal to set a counted value as a vertical position value;

loading the vertical position value by a vertical synchronization signal to be down-counted according to a horizontal synchronization signal and generating a vertical detection signal when the counted value is zero;

up/down-counting an X clock which determines the speed of moving the pointer horizontally according to a left- or right-signal to set the counted value as a horizontal position value;

down-counting the horizontal position value by the horizontal synchronization signal according to an OSD clock and generating a horizontal detection signal when the counted value is zero;

activating a pointer read signal when the vertical detection signal and the horizontal detection signal are simultaneously activated;

producing a shift signal responsive to the OSD clock;

counting the horizontal synchronization signal when the vertical detection signal is activated and generating a row address;

outputting pointer font data by the row address when the pointer read signal is activated;

shifting the loaded pointer font data by a shift signal to produce a serial pointer font data signal;

outputting the pointer font data signal as a pointer video signal RGB according to a given pointer color signal; and switching the pointer video signal into the output video signals RED, GREEN and BLUE and transmitting the same upon the generation of the pointer video signal RGB during transmission of the video signal RGB generated in the menu OSD circuit as output signals RED, GREEN and BLUE.

* * * * *